US012657324B2

(12) United States Patent
Gajra et al.

(10) Patent No.: US 12,657,324 B2
(45) Date of Patent: Jun. 16, 2026

(54) DETECTING DATA EXFILTRATION

(71) Applicant: INTERNATIONAL BUSINESS MACHINES CORPORATION, Armonk, NY (US)

(72) Inventors: Dimple Gajra, Seattle, WA (US); Richard Howe, Mebane, NC (US); Nikki Elyse Robinson, Davidsonville, MD (US); David Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 18/633,738

(22) Filed: Apr. 12, 2024

(65) Prior Publication Data

US 2025/0322089 A1     Oct. 16, 2025

(51) Int. Cl.
*G06F 21/62* (2013.01)
*G06F 21/55* (2013.01)

(52) U.S. Cl.
CPC ........ *G06F 21/6218* (2013.01); *G06F 21/554* (2013.01); *G06F 2221/034* (2013.01)

(58) Field of Classification Search
CPC .............. G06F 21/6218; G06F 21/554; G06F 2221/034
See application file for complete search history.

(56) References Cited

U.S. PATENT DOCUMENTS

| | | | | |
|---|---|---|---|---|
| 10,091,222 | B1 * | 10/2018 | Langton | H04L 63/1441 |
| 10,104,102 | B1 * | 10/2018 | Neumann | H04L 63/1441 |
| 10,467,414 | B1 | 11/2019 | Kindlund et al. | |
| 11,057,410 | B1 * | 7/2021 | Myers | H04L 43/065 |
| 11,449,603 | B2 | 9/2022 | Tietz et al. | |
| 11,451,550 | B2 * | 9/2022 | Sloane | H04L 63/1433 |
| 11,580,248 | B2 | 2/2023 | Monaco et al. | |
| 11,868,495 | B2 | 1/2024 | Bednash et al. | |
| 12,003,518 | B2 * | 6/2024 | Bebchuk | H04L 63/0227 |
| 2019/0036955 | A1 | 1/2019 | Langton et al. | |
| 2020/0074106 | A1 * | 3/2020 | Narayanaswamy | G06F 21/6209 |
| 2020/0358792 | A1 * | 11/2020 | Bazalgette | G06N 20/00 |
| 2022/0263867 | A1 | 8/2022 | Mukherjee | |
| 2022/0350905 | A1 * | 11/2022 | Juncker | G06F 16/1734 |
| 2023/0153425 | A1 * | 5/2023 | Yuceer | H04L 63/1425 726/23 |

(Continued)

FOREIGN PATENT DOCUMENTS

| | | | | |
|---|---|---|---|---|
| WO | | 2015163953 A2 | 10/2015 | |
| WO | | WO-2019046147 A8 * | 12/2019 | G06F 21/577 |

OTHER PUBLICATIONS

Suresh et al, An Integrated Exfiltration monitoring tool for a large organization with highly confidential data source, 2012 4th Computer Science and Electronics Engineering Conference (CEEC), pp. 1-5 (Year: 2012).*

(Continued)

*Primary Examiner* — Christopher A Revak
(74) *Attorney, Agent, or Firm* — CHIP LAW GROUP

(57) ABSTRACT

Methods and systems for exfiltration detection include monitoring file system activity relating to a data transfer. An exfiltration score is determined for data that is subject to the data transfer. Exfiltration activity is identified based on the exfiltration score. A responsive action is performed relating to the exfiltration activity.

18 Claims, 5 Drawing Sheets

(56) References Cited

U.S. PATENT DOCUMENTS

| | | | |
|---|---|---|---|
| 2023/0239303 A1* | 7/2023 | Hutelmyer | H04L 63/102 726/4 |
| 2023/0274017 A1 | 8/2023 | Juncker et al. | |
| 2024/0257263 A1* | 8/2024 | Thompson | G06F 21/554 |
| 2024/0422007 A1* | 12/2024 | Teal | H04L 9/3239 |
| 2025/0039067 A1* | 1/2025 | Crabtree | H04L 43/028 |

OTHER PUBLICATIONS

Cyberreason, "Threat Analysis Report_ Inside the LockBit Arsenal—The StealBit Exfiltration Tool", https://www.cybereason.com/blog/research/threat-analysis-report-inside-the-lockbit-arsenal-the-stealbit-exfiltration-tool, Retrieved Oct. 2023, pp. 1-22.

Dynatrace, "Filesystem monitoring monitoring & observability _ Dynatrace Hub", https ://www.dynatrace.com/hub/detail/filesystem-monitoring-extension-v2/, Retrieved Oct. 2023, pp. 1-1.

FSMonitor, "Visualize changes to the file system—Realtime", https://fsmonitor.com/, Retrieved Oct. 2023, pp. 1-5.

Imperva, "What We Learned from the 2023 Imperva Bad Bot Report", https://www.imperva.com/blog/2023-imperva-bad-bot-report-key-learnings/, Retrieved Oct. 2023, pp. 1-6.

Trellix, "What is DLP and How Does It Work?", https://www.trellix.com/security-awareness/data-protection/how-data-loss-prevention-dlp-technology-works/, Retrieved Sep. 2023, pp. 1-7.

"XForce Threat Intelligence Index 2023", https://www.ibm.com/reports/threat-intelligence, Feb. 2023, pp. 1-58.

Wikipedia, List of File Systems, Retrieved from: https://en.wikipedia.org/w/index.php?title=List_of_file_systems&oldid=1210669607, Feb. 27, 2024, 15 pages.

* cited by examiner

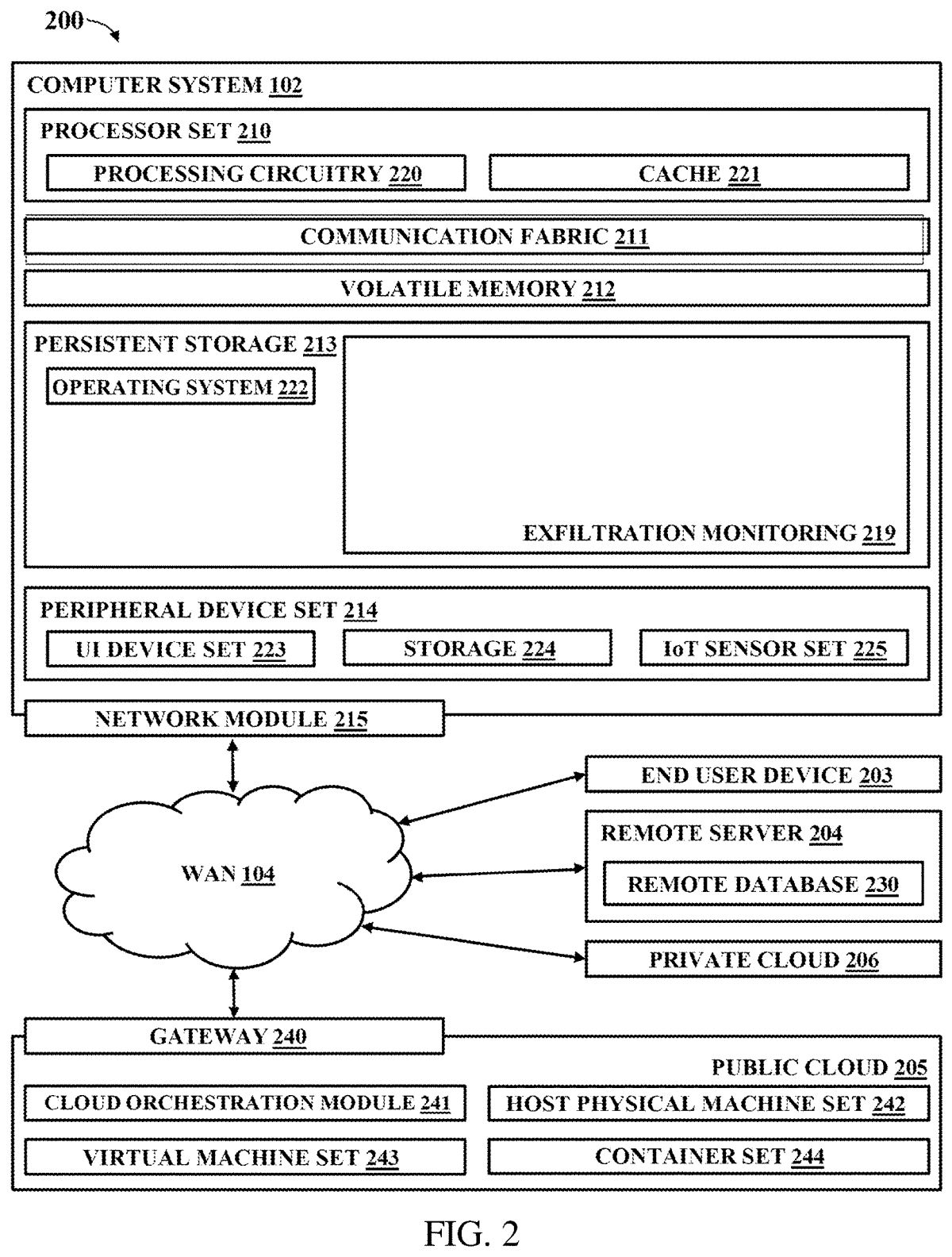

200

COMPUTER SYSTEM 102

PROCESSOR SET 210

| PROCESSING CIRCUITRY 220 | CACHE 221 |
|---|---|

COMMUNICATION FABRIC 211

VOLATILE MEMORY 212

PERSISTENT STORAGE 213

OPERATING SYSTEM 222

EXFILTRATION MONITORING 219

PERIPHERAL DEVICE SET 214

| UI DEVICE SET 223 | STORAGE 224 | IoT SENSOR SET 225 |
|---|---|---|

NETWORK MODULE 215

WAN 104

END USER DEVICE 203

REMOTE SERVER 204

REMOTE DATABASE 230

PRIVATE CLOUD 206

GATEWAY 240

PUBLIC CLOUD 205

| CLOUD ORCHESTRATION MODULE 241 | HOST PHYSICAL MACHINE SET 242 |
|---|---|
| VIRTUAL MACHINE SET 243 | CONTAINER SET 244 |

FIG. 2

DETECTING DATA EXFILTRATION

BACKGROUND

The present invention generally relates to cybersecurity and, more particularly, to detecting the exfiltration of data from a computer system.

Data exfiltration refers to the removal of data from a computer system. This may occur in the context of an intrusion, for example when a malicious actor penetrates the security of a computer system and copies sensitive information. However, data exfiltration may also occur when a trusted actor illicitly accesses information as an act of corporate espionage or trade secret theft.

SUMMARY

A method for exfiltration detection includes monitoring file system activity relating to a data transfer. An exfiltration score is determined for data that is subject to the data transfer. Exfiltration activity is identified based on the exfiltration score. A responsive action is performed relating to the exfiltration activity.

A system for exfiltration detection includes a hardware processor and a memory that stores a computer program. When executed by the hardware processor, the computer program causes the hardware processor to monitor file system activity relating to a data transfer, to determine an exfiltration score for data that is subject to the data transfer, to identify exfiltration activity based on the exfiltration score, and to perform a responsive action relating to the exfiltration activity.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 2 is a block diagram of a computer system that can perform exfiltration monitoring, in accordance with an embodiment of the present invention;

DETAILED DESCRIPTION

Existing data exfiltration detection techniques use software sensors to identify exfiltration-related activities in a computing environment. However, existing solutions cannot accurately identify where the data was exfiltrated, nor can they identify which documents were exfiltrated. To address these concerns, the file system of a computing environment may be enhanced to detect data exfiltration, for example tracking the destination of a copy or read operation.

One challenge in tracking intrusions and data exfiltration is the potential for tampering by sophisticated bad actors. In particular, a sophisticated actor may have the capability of tampering with logs relating to tracking exfiltration operations. The exfiltration information may therefore be stored directly in the file system along with other metadata for sensitive information, creating a record that is difficult to tamper with absent low-level access to the operating system.

Figure 1:
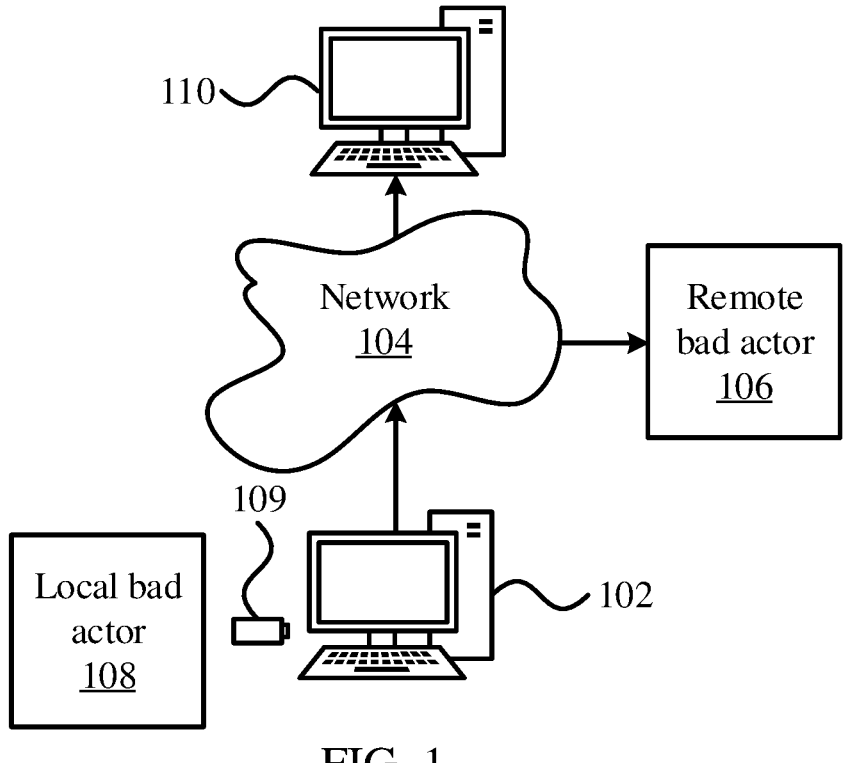
FIG. 1 is a diagram of a computing environment where data may be exfiltrated in a variety of scenarios, in accordance with an embodiment of the present invention.

Referring now to FIG. 1, exfiltration of data from an exemplary computer system 102 is shown. The computer system 102 may be any appropriate system, such as a desktop workstation, a server, a laptop, a mobile device, an embedded Internet of Things device, or any other type of computing device that may store sensitive information. The computer system 102 may be connected to a network 104, such as the Internet, a corporate intranet, or a home network, by any appropriate wired or wireless communications medium or protocol.

In one scenario, a remote bad actor 106 accesses the computer system 102 via the network 104, for example exploiting a security vulnerability in the computer system 102. The remote bad actor 106 may have full access to the computer system, as if they were physically present with administrator privileges, or may have a more limited access. The access may be logged or may circumvent security monitoring at the computer system 102. During exfiltration of data, the remote bad actor 106 may read data files stored on the computer system 102 or on a device connected to the computer system 102, such as a network attached storage (NAS) device or external hard drive. The remote bad actor 106 may then download data from the computer system 102 to a remote location.

In another scenario, a local bad actor 108 with physical access to the computer system 102 copies or uploads data files that are stored on the computer system 102 or on a device connected to the computer system 102. The local bad actor 108 may upload data files to a remote computer system 110, for example by emailing them or by using a file transfer protocol. The local bad actor 108 may also transfer data files to a removable storage device 109, at which point the local bad actor 108 may simply walk out with them.

In another scenario, the computer system 102 may be infected with malicious software, such as a virus, malware, or a trojan horse program. The malicious software may automatically scan the computer system 102 for sensitive information and may upload the sensitive information to a remote computer system 110.

In any of these scenarios, the data exfiltration takes advantage of functions built into the computer system 102, such as filesystem actions (e.g., opening, copying, and moving files), network actions (e.g., uploading and downloading data), and user interface actions (e.g., displaying information). The computer system 102 may therefore be modified to track and log such actions to detect data exfiltration and to identify the destination of the exfiltration. This can help to prevent exfiltration in some instances, and can further be used to track the bad actors behind the exfiltration. Having detailed information regarding the exfiltration, such as identifying where the data went, can help to determine the next steps in recovering from a breach.

To that end, data loss prevention software may be used at the computer system 102 to perform content inspection and contextual analysis of data sent via messaging applications, such as email and instant messaging. Such software may be used in managed endpoint devices as well as in on-premises file servers and cloud storage. Policies and rules may be employed to indicate automatic responses according to the risk of inadvertent or accidental leaks of sensitive data outside authorized channels.

However, data loss prevention software may not provide accurate information if the data was exfiltrated via a local access, such as by a removable storage device 109, network shares, Bluetooth, printing, fax, or an employee's personal email. Furthermore, such data loss prevention software may need a large volume of data to scan from to prevent false positives and negatives.

In some cases, the file system of the computer system 102 may itself be modified to track information about file system operations. With this information, a pattern of operations can be logged and analyzed to classify the operations as benign or suspicious. This processing can be performed in any appropriate way, such as by heuristics, policies, or machine learning. Exemplary responses may include, e.g., blocking suspicious operations, or delaying transfers, or rerouting data transfers to use dummy files or other trojan or traceback files.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 2, a block diagram of a computing environment is shown. Computing environment 200 contains an example of an environment for the execution of at least some of the computer code involved in performing the inventive methods, such as exfiltration monitoring 219. In addition to block 219, computing environment 200 includes, for example, computer 102, wide area network (WAN) 104, end user device (EUD) 203, remote server 204, public cloud 205, and private cloud 206. In this embodiment, computer 201 includes processor set 210 (including processing circuitry 220 and cache 221), communication fabric 211, volatile memory 212, persistent storage 213 (including operating system 222 and block 219, as identified above), peripheral device set 214 (including user interface (UI) device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244.

COMPUTER 201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible.

Computer 201 may be located in a cloud, even though it is not shown in a cloud in FIG. 2. On the other hand, computer 201 is not required to be in a cloud except to any extent as may be affirmatively indicated.

PROCESSOR SET 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in block 219 in persistent storage 213.

COMMUNICATION FABRIC 211 is the signal conduction path that allows the various components of computer 201 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 212 is any type of volatile memory now known or to be developed in the future. Examples include dynamic type random access memory (RAM) or static type RAM. Typically, volatile memory 212 is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

PERSISTENT STORAGE 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface-type operating systems that employ a kernel. The code included in block 219 typically includes at least some of the computer code involved in performing the inventive methods.

PERIPHERAL DEVICE SET 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers.

IoT sensor set 225 is made up of sensors that can be used in Internet of Things applications. For example, one sensor may be a thermometer and another sensor may be a motion detector.

NETWORK MODULE 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices.

Computer readable program instructions for performing the inventive methods can typically be downloaded to computer 201 from an external computer or external storage device through a network adapter card or network interface included in network module 215.

WAN 202 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

REMOTE SERVER 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

PUBLIC CLOUD 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202. Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 3:
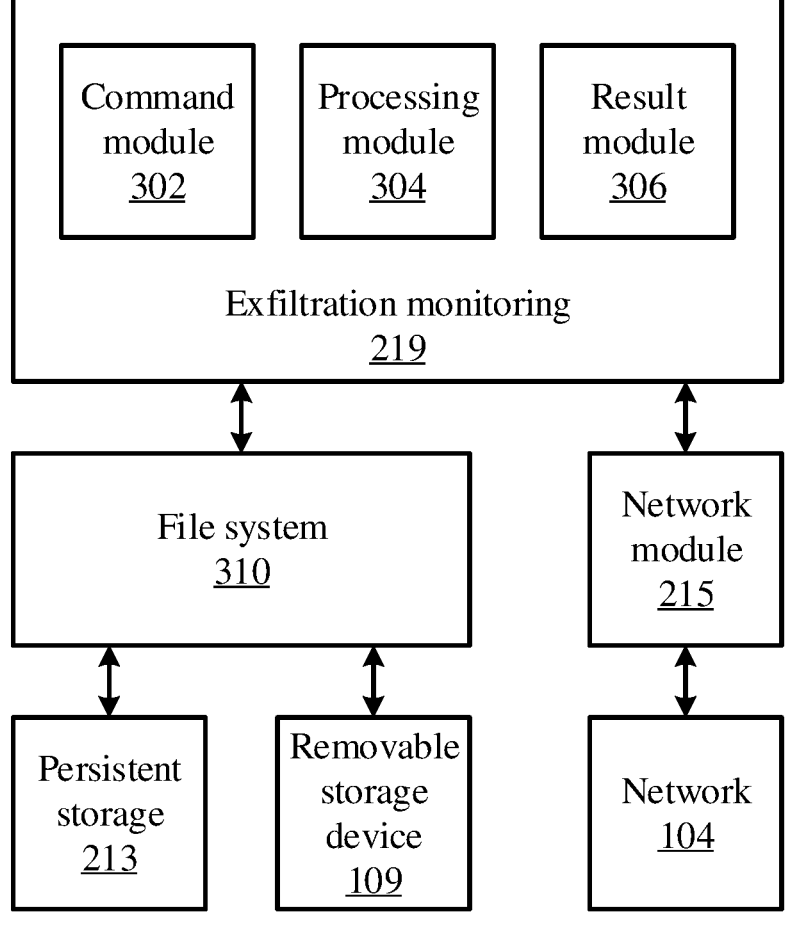
FIG. 3 is a block diagram of exfiltration monitoring, in accordance with an embodiment of the present invention.

Referring now to FIG. 3, additional detail on exfiltration monitoring 219 is shown. The exfiltration monitoring 219 includes a command module 302 and a processing module 304. Exfiltration monitoring may be implemented as a standalone software program that interfaces with the file system 310 and network module 215, or it may be implemented as part of the file system 310 itself.

As data is accessed through the file system 310, for example from persistent storage 213 or a removable storage device 109, the command module 302 monitors input/output operations, commands, hardware operations, and software operations. Data may collected from various locations, for example including audit logs, spool logs, website requests and response, cron jobs, command histories, device mounting records, email folders, journal events, system file tables, and file information and operations in RAM. For example, command module 302 may access data from logs using text processing commands such as grep, awk, sed, and regular expressions. Event identifiers may be extracted from powershell logs and shell history files.

The processing module 304 accesses the information collected by the command module 302 and acts on it. This may include, for example, applying a machine learning model to identify suspicious activity. A decision tree algorithm may be used on the data from the command module 302 to determine if data has been exfiltrated. A result module 306 adds the results of the processing module 304 to a log, which may include numbers of bytes sent and received, commands and techniques used for exfiltration, exfiltration destination, names of files that were transferred, users associated with such transfers, and the start and stop time of the transfers.

In some cases, the result module 306 may trigger further security actions pertaining to the exfiltrated data. For example, interdiction may be performed to block, classify, report, or reroute file calls prior to their completion. The data being exfiltrated may thereby be replaced with dummy data, such as random data or data that is known to be valueless. In some cases the data being exfiltrated may be replaced with a computer program that, when executed will aid in tracing the exfiltration or that will otherwise provide countermeasures against the bad actor. In some cases, the result module 306 may send a ticket for review by a security operator.

The result module 306 may log results in a new file stored on the file system 310, or may store information relating to file accesses in attributes relating to the files being accessed, for example in the same place where filenames are stored. In some cases, a master file table or inode table may be used to store such information. In this case, the file system 310 may be modified to store such information. For example, the underlying filename object in a master file table is:

```
Typedef struct _FILENAME {
FILE_REFERENCE ParentDirectory;
UCHAR Reserved [0x38];
UCHAR FileNameLength;
UCHAR Flags;
WCHAR FileName[1];
} FILE_NAME, *PFILE_NAME;
```

Additional variables can be added to this object, including ExfilResults and UploadDestination. The value of ExfilResults may then be a score determined from the decision tree, while the value of UploadDestination may include an IP address or other identifier of where the data was transferred to. These values may be updated whenever the file is accessed, based on the number of times the file is touched and the operations that are performed.

In the case of a file system that uses an inode table, the inode is a data structure that includes metadata about files. Such metadata may include a user identifier of the file, a group identifier of the file, a device identifier, a file size, a date of creation, permissions, an owner of the file, a file protection flag, and a link counter to determine a number of hard links. ExfilResults and UploadDestination attributes can be added to the inode data structure to indicate the exfiltration score.

Figure 4:
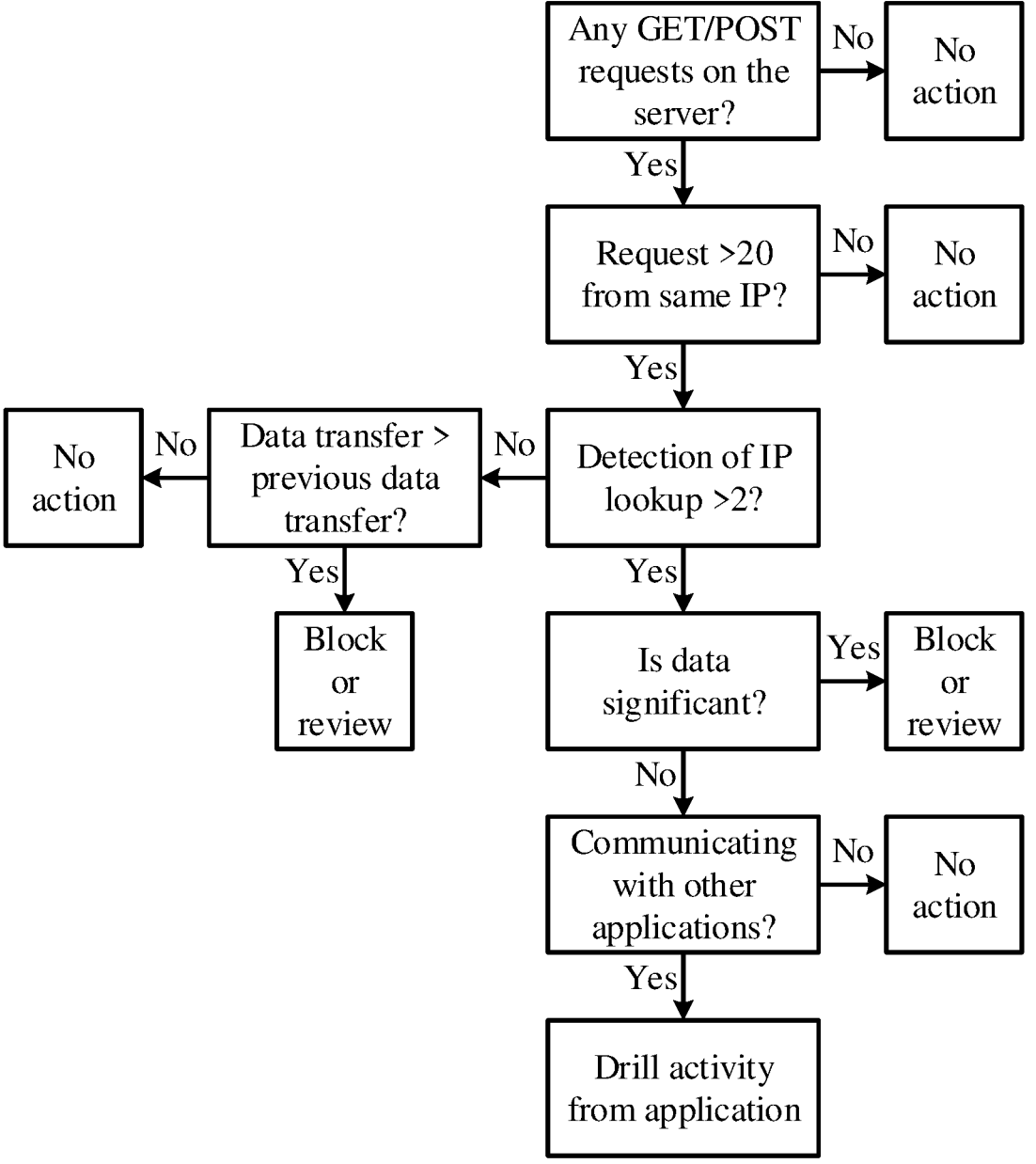
FIG. 4 is a block diagram illustrating a decision tree that can be used to identify exfiltration of data, in accordance with an embodiment of the present invention.

Referring now to FIG. 4, an exemplary decision tree for exfiltration detection is shown. At each stage, a decision may be made regarding the data collected by the command module 302. For example, a first decision is whether there are any GET/POST requests. If not, no action is taken. A next decision determines whether a threshold number of requests from a same IP (internet protocol) address have been detected.

In some cases, the decision tree reaches the determination that the operation in question should be blocked or reviewed. Blocking the operation may include, for example, terminating a file transfer over a network or to a storage device. This can prevent exfiltration from succeeding when caught in time, or can help to identify potential exfiltration events by a security analyst.

This is just one example of a decision tree that may be used to identify exfiltration. In another example, a decision tree may review data pertaining command line activity, with command logs being parsed to identify instructions that potentially relate to exfiltration. Using such a decision tree can identify suspicious behavior by bad actor seeking to locate and exfiltrate sensitive information.

The decision tree may be generated from a training data set that includes exfiltration activities that have been identified in the past. The rules of the decision tree may be determined by subject matter experts, may be gleaned from previously observed exfiltration activities, and may be collected from published exfiltration studies. Scores may be assigned to the outcomes, to reflect a level of severity or likelihood of exfiltration. In some cases, the decision tree may be replaced by a machine learning model that is trained in a supervised fashion based on a set of training data that identifies exfiltration activities and labels them with scores and preferred outcomes.

An exfiltration score for a single operation may thus be determined from the decision tree. In some cases, the exfiltration score may be a binary value, indicating whether the operation is regarded as an exfiltration activity. In some cases, the exfiltration score may be a percentage or other likelihood value, indicating a probability that the operation is an exfiltration operation. In some cases, exfiltration scores may be gathered from multiple operations, such that multiple related operations that are individually below a threshold for indicating exfiltration activity may together indicate such an activity.

Figure 5:
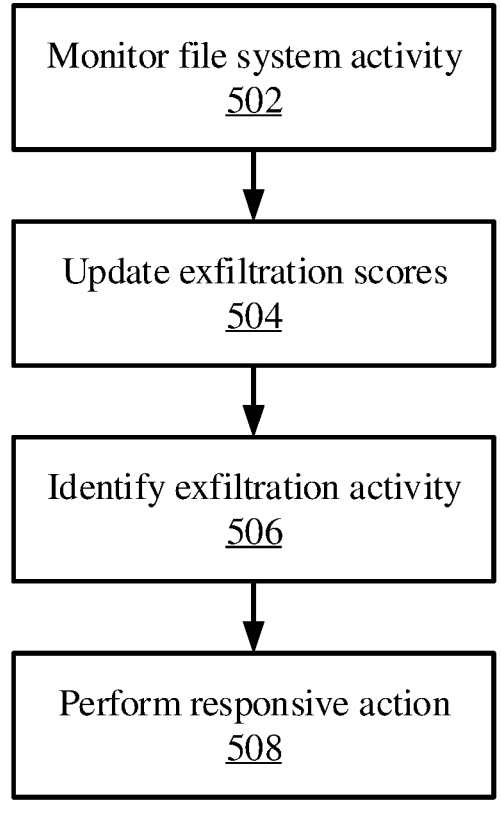
FIG. 5 is a block/flow diagram of a method for detecting and responding to data exfiltration, in accordance with an embodiment of the present invention.

Referring now to FIG. 5, a method of detecting and responding to data exfiltration is shown. Block 502 monitors file system activity via the control module 302, for example by accessing logs that indicate file system operations. In some cases, monitoring the file system activity may include monitoring operating system calls and low-level input/output (I/O) calls to the file system. Block 504 then updates exfiltration scores associated with files that have been accessed, for example processing the data using the decision tree(s) of the processing module 304.

Based on the exfiltration scores, for example comparing the scores to a threshold value, block 506 identifies exfiltration activity. The result module 306 can then perform a responsive action at block 508, for example by blocking the exfiltration and/or flagging the exfiltration for subsequent review.

Figure 6:
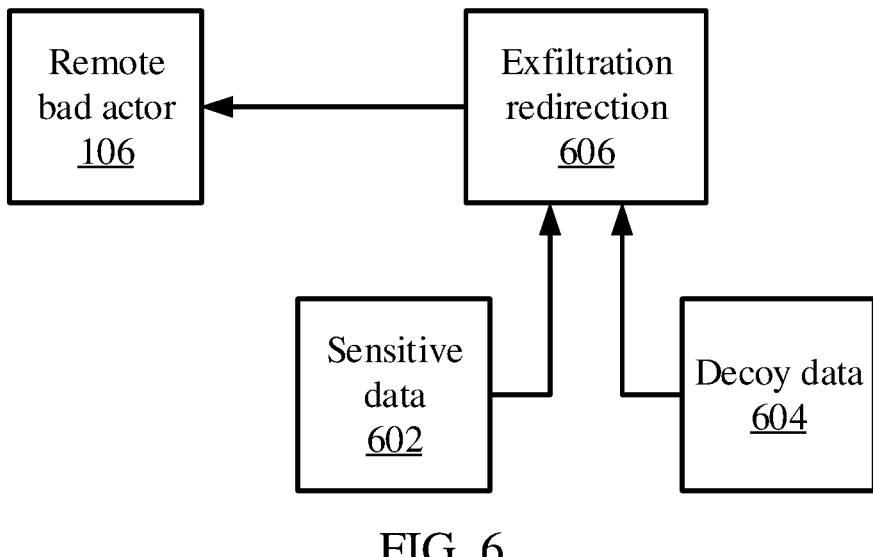
FIG. 6 is a diagram illustrating exfiltration redirection that is performed in response to the detection of an exfiltration attempt.

Referring now to FIG. 6, an illustration of an action responsive to a detected exfiltration attempt is shown. In this instance, a bad actor 106 attempts to copy or transfer sensitive data 602. After the exfiltration attempt is detected, for example in the manner described above, exfiltration redirection 606 is performed to interrupt the transfer of sensitive data 602. Rather than simply blocking the transfer of data, exfiltration redirection 606 instead continues the transfer but uses decoy data 604 instead. The decoy data 604 may be, for example, random data or any other meaningless or unimportant data. In some cases, decoy data 604 may be selected to resemble the sensitive data 602, but may have incorrect or misleading content.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of detecting data exfiltration (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for exfiltration detection, comprising:
monitoring file system activity relating to a data transfer;
determining an exfiltration score for data that is subject to the data transfer;
storing the exfiltration score and an upload destination in file system metadata for the data;
identifying exfiltration activity based on the exfiltration score; and
performing a responsive action relating to the exfiltration activity.

2. The method of claim 1, wherein determining the exfiltration score includes a decision tree that assigns the exfiltration score in accordance with attributes of the data transfer.

3. The method of claim 2, further comprising generating the decision tree from a training set that includes past exfiltration activities.

4. The method of claim 2, wherein exfiltration scores are assigned to outcomes of the decision tree to reflect a level of severity or likelihood of exfiltration.

5. The method of claim 1, wherein storing the exfiltration score and the upload destination includes storing metadata in a _FILENAME data type of a master file table.

6. The method of claim 1, wherein storing the exfiltration score and the upload destination includes storing metadata in an inode of an inode table.

7. The method of claim 1, wherein monitoring the file system activity includes determining at least one of a destination of the data transfer and commands entered for the data transfer.

8. The method of claim 1, wherein the responsive action further includes an action selected from the group consisting of blocking the data transfer and redirecting the data transfer.

9. The method of claim 1, wherein monitoring the file system activity includes monitoring changes to logs that indicate file system operations.

10. A computer program product for exfiltration detection, the computer program product comprising a computer readable storage medium having program instructions embodied therewith, the program instructions executable by a hardware processor to cause the hardware processor to:
monitor file system activity relating to a data transfer;
determine an exfiltration score for data that is subject to the data transfer;
store the exfiltration score and an upload destination in file system metadata for the data;
identify exfiltration activity based on the exfiltration score; and
perform a responsive action relating to the exfiltration activity.

11. A system for exfiltration detection, comprising:
a hardware processor; and
a memory that stores a computer program which, when executed by the hardware processor, causes the hardware processor to:
monitor file system activity relating to a data transfer;
determine an exfiltration score for data that is subject to the data transfer;
store the exfiltration score and an upload destination in file system metadata for the data;
identify exfiltration activity based on the exfiltration score; and
perform a responsive action relating to the exfiltration activity.

12. The system of claim 11, wherein determining the exfiltration score includes a decision tree that assigns the exfiltration score in accordance with attributes of the data transfer.

13. The system of claim 12, further comprising generating the decision tree from a training set that includes past exfiltration activities.

14. The system of claim 12, wherein exfiltration scores are assigned to outcomes of the decision tree to reflect a level of severity or likelihood of exfiltration.

15. The system of claim 11, wherein storing the exfiltration score and the upload destination includes storing metadata in a _FILENAME data type of a master file table.

16. The system of claim 11, wherein storing the exfiltration score and the upload destination includes storing metadata in an inode of an inode table.

17. The system of claim 11, wherein monitoring the file system activity includes determining at least one of a destination of the data transfer and commands entered for the data transfer.

18. The system of claim 11, wherein the responsive action includes an action selected from the group consisting of blocking the data transfer and redirecting the data transfer.

* * * * *